US012803274B2

(12) United States Patent
Sadiq et al.

(10) Patent No.: US 12,803,274 B2
(45) Date of Patent: Nov. 17, 2026

(54) AIRCRAFT ELECTRICAL-FAULT PROTECTION

(71) Applicant: Hamilton Sundstrand Corporation, Charlotte, NC (US)

(72) Inventors: Muhammad Nouman Sadiq, Solihull (GB); Ajith Balachandran, Solihull (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 19/188,999

(22) Filed: Apr. 24, 2025

(65) Prior Publication Data

US 2025/0392117 A1 Dec. 25, 2025

(30) Foreign Application Priority Data

Jun. 24, 2024 (EP) .................................... 24275072

(51) Int. Cl.
*H02H 7/22* (2006.01)
*B64D 27/33* (2024.01)
*B64D 45/00* (2006.01)

(52) U.S. Cl.
CPC ............... *H02H 7/22* (2013.01); *B64D 27/33* (2024.01); *B64D 45/00* (2013.01)

(58) Field of Classification Search
CPC ........... H02H 7/22; B64D 27/33; B64D 45/00
See application file for complete search history.

(56) References Cited

U.S. PATENT DOCUMENTS 8,125,747 B2 * 2/2012 Ganev .................. H02P 29/032 318/432
10,507,731 B2 12/2019 Tsukada et al.
10,946,748 B2 3/2021 El-Refaie et al.
11,063,527 B2 7/2021 Trainer et al.
2019/0149063 A1 * 5/2019 Onda ........................ B60L 3/12 361/30
2022/0094297 A1 * 3/2022 Lacaux ................ B64D 27/357
2022/0402364 A1 12/2022 Khozikov et al.
2023/0257127 A1 8/2023 Loder et al.

OTHER PUBLICATIONS

European Search Report in connection with counterpart European Patent Application No. 24275072.7 dated Jan. 3, 2025, 11 pages.

* cited by examiner

*Primary Examiner* — Carlos Amaya

(57) ABSTRACT

An electrical system for protecting an aircraft from electrical faults includes an AC-DC switching converter and a controller for controlling the AC-DC switching converter. The AC-DC switching converter includes a set of AC phase lines for electrical coupling to an electrical machine of the aircraft, a plurality of converter switches, and a positive DC line and a negative DC line for electrical coupling to a DC bus of the aircraft. The controller is configured, in response to receiving a signal indicative of an electrical fault in wiring or equipment electrically coupled to the AC-DC switching converter, to close two or more of the plurality of converter switches so as to electrically couple two or more of the AC phase lines to a common one of the DC lines for a period of time spanning a plurality of revolutions of the electrical machine.

20 Claims, 4 Drawing Sheets

AIRCRAFT ELECTRICAL-FAULT PROTECTION

CROSS-REFERENCE TO RELATED APPLICATION AND PRIORITY CLAIM

This application claims priority under 35 U.S.C. § 119 to European Patent Application No. 24275072.7 filed on Jun. 24, 2024, which is hereby incorporated by reference in its entirety.

TECHNICAL FIELD

The present disclosure relates to systems, methods and software for protecting an aircraft from electrical faults.

BACKGROUND

Hybrid electric aircraft architectures have electric machines systems mechanically coupled with engines for power generation and extraction. In such systems, there is a risk of electrical faults such as short circuits. Electrical machines for aircraft are typically designed to be fault tolerant, with the short circuit current of the electrical machine being very close to the rated current of the machine. This allows an electrical machine to indefinitely withstand a short circuit at its terminals.

However, short circuits can lead to large amounts of energy being dumped through a fault point, such as a short circuit, when this is located in wiring or equipment beyond the electrical machine itself. Such high energy at a single point can cause high temperatures and lead to a fire hazard and component failure.

It is desired to find a way of protecting an aircraft from electrical faults of this kind.

SUMMARY OF THE DISCLOSURE

From a first aspect, the disclosure provides an electrical system for protecting an aircraft from electrical faults, the electrical system comprising: an AC-DC switching converter; and a controller for controlling the AC-DC switching converter, wherein the AC-DC switching converter comprises: a set of AC phase lines, for electrical coupling to an electrical machine of the aircraft; a plurality of converter switches; and a positive DC line and a negative DC line, for electrical coupling to a DC bus of the aircraft; and wherein the controller is configured, in response to receiving a signal indicative of an electrical fault in wiring or equipment electrically coupled to the AC-DC switching converter, to close two or more of the plurality of converter switches so as to electrically couple two or more of the AC phase lines to a common one of the DC lines for a period of time spanning a plurality of revolutions of the electrical machine.

From a second aspect, the disclosure provides a method for protecting an aircraft from an electrical fault by controlling an AC-DC switching converter of an electrical system of the aircraft, wherein the AC-DC switching converter comprises: a set of AC phase lines, electrically coupled to an electrical machine of the aircraft; a plurality of converter switches; and a positive DC line and a negative DC line, electrically coupled to a DC bus of the aircraft; the method comprising, in response to detecting an electrical fault in wiring or equipment electrically coupled to the AC-DC switching converter, closing two or more of the plurality of converter switches so as to electrically couple two or more of the AC phase lines to a common one of the DC lines for a period of time spanning a plurality of revolutions of the electrical machine.

From a third aspect, the disclosure provides computer software (and a non-transitory computer-readable medium carrying the same) comprising instructions for execution by a processor of a controller for controlling an AC-DC switching converter of an electrical system of an aircraft, the AC-DC switching converter comprising: a set of AC phase lines, for electrical coupling to an electrical machine of the aircraft; a plurality of converter switches; and a positive DC line and a negative DC line, for electrical coupling to a DC bus of the aircraft; wherein the instructions, when executed, cause the controller, in response to receiving a signal indicative of an electrical fault in wiring or equipment electrically coupled to the AC-DC switching converter, to close two or more of the plurality of converter switches so as to electrically couple two or more of the AC phase lines to a common one of the DC lines for a period of time spanning a plurality of revolutions of the electrical machine.

Thus it will be seen that, in accordance with examples of the disclosure, by controlling the switches of the AC-DC converter to electrically couple (i.e. clamp) two or more of the AC phase lines to a common DC line for multiple AC cycles, a low impedance path can be provided through the converter, allowing electrical energy from the electrical machine to be principally dissipated through the converter, instead of through the electrical fault. This can eliminate or substantially reduce current flow through the electrical fault, which might otherwise endanger the aircraft.

The electrical system may comprise or be part of a hybrid-electric propulsion (HEP) system for a hybrid-electric aircraft.

The electrical system may comprise the electrical machine. The electrical machine may be a permanent magnet synchronous motor (PMSM). It may be for propelling the aircraft. The electrical machine may be configured for mechanical coupling to a thermal engine of the aircraft (e.g. to a spool of a turbine engine), e.g. when the electrical machine is operating in a generating mode. The electrical machine may be configured for mechanical coupling to a propeller or fan of the aircraft, e.g. when the electrical machine is operating in a motoring mode.

The switching converter may be configured to support electrical inversion (e.g. when the electrical machine is operating in a motoring mode powered by a DC battery) and/or rectification (e.g. when the electrical machine is operating in a generating mode).

The plurality of switches may comprise a different respective set (e.g. a pair) of switches for each AC phase line and/or each phase of the electrical machine. Each AC phase line may be electrically coupled between a respective pair of converter switches. In some examples, the electrical machine is a three-phase machine and the AC-DC switching converter comprises exactly six converter switches. Each converter switch may be a respective MOSFET.

In some examples, the controller is configured, in response to receiving the signal indicative of the electrical fault, to close a respective first converter switch of a pair of converter switches for each phase line so as to electrically couple all of the AC phase lines to the common one of the DC lines. This can create a balanced short-circuit, within the converter, between all of the phases of the electrical machine; this may help with uniform power dissipation. The controller may be further configured to open a respective second converter switch of the pair of converter switches for each phase line so as to electrically decouple all of the AC phase lines from the other one of the DC lines. This can prevent an AC short circuit fault from leading to a short on the DC bus.

In some examples, the common DC line is the negative DC line. In other examples, the common DC line is the positive DC line.

In some examples, each of the plurality of switches is rated to handle a current equal to or higher than a rated phase current of the electrical machine. In this way, even if the electrical machine were to continue rotating indefinitely after the signal indicating the electrical fault, all the electrical energy output by the electrical machine could be safely dissipated by the AC-DC converter.

In some examples, in response to detecting the electrical fault, the electrical machine is mechanically decoupled from a thermal engine and/or propeller or fan of the aircraft. The controller may be configured to initiate the decoupling in response to receiving the signal indicative of the electrical fault, or the electrical system may comprise a further subsystem configured to initiate the decoupling in response to the signal, or another signal, indicative of the electrical fault. The mechanical disconnection may, in some examples, not be completed until sometime after the electrical fault is detected, e.g. one second or more. The electrical machine may also take some time to come to rest after being disconnected (i.e. to coast down), e.g. due to inertia in the electrical machine.

The AC-DC switching converter and electrical machine may together dissipate at least 75% or 90% or 100% of the electrical energy generated by the electrical machine after the electrical fault is detected or after the controller receives the signal indicative of the electrical fault.

In some examples, the signal indicative of the electrical fault is indicative of a short circuit. The electrical fault may be located on an AC side of the AC-DC converter or on a DC side of the AC-DC converter. It may be indicative of an electrical fault between two or more AC phases.

The two or more switches may be closed for a period of time in which the electrical machine is coasting down. In some examples, this period of time may be at least one second or more. In some examples, after the signal indicative of the electrical fault has been received and the two or more converter switches are closed, the states of the plurality of converter switches remains constant at least until the electrical machine stops rotating.

In some examples, the AC-DC switching converter is a two-level converter.

The electrical system may further comprise detection circuitry configured to detect the electrical fault (e.g. a short circuit) and to output the signal indicative of the electrical fault to the controller (e.g. over a communication wire or bus). In some examples, the detection circuitry comprises an overcurrent sensor and/or an overvoltage sensor. The detection circuitry may be located on an AC side and/or a DC side of the converter.

In some examples, the controlling of the switches is performed at least in part by software instructions. In some examples, some or all of the method steps described herein may be implemented through hardware circuitry such as logic gates and/or discrete components.

Features of any aspect or example described herein may, wherever appropriate, be applied to any other aspect or example described herein. Where reference is made to different examples or sets of examples, it should be understood that these are not necessarily distinct but may overlap.

BRIEF DESCRIPTION OF THE DRAWINGS

Certain preferred examples of the disclosure will now be described, by way of example only, with reference to the accompanying drawings, in which.

DETAILED DESCRIPTION

Electrical systems used in hybrid electric propulsion (HEP) aircraft, in accordance with examples of the present disclosure, may have AC cables that connect an electrical machine to an AC-DC switching converter. A DC bus may be connected to a pair of DC lines from the converter. The electrical machine may be used both to provide thrust to the aircraft (e.g. powered by a battery), when operating in a motoring mode, and to generate electricity (e.g. to recharge a battery and/or power systems on the aircraft), powered by a thermal engine, when operating in a generating mode.

AC-DC converters can convert DC power received from, for example, a high voltage DC bus (HVDC bus), to AC power to be used by the electrical machine when the machine is in a motoring mode. Additionally, when the electrical machine is in a generating mode, the generated AC power can be converted by the converter to DC power and output to the HVDC bus.

The AC feeder from the electrical machine to the converter may be long, e.g. running most of the length of the fuselage, and can be vulnerable to damage. DC wiring and equipment can also fail. It is possible that, over time, insulation on the AC or DC wiring could become worn to the point of causing an electrical fault such as a short circuit (e.g. an AC line-to-line fault), or falling debris (e.g. a loose screw) could cause a short circuit (e.g. in a DC fuse cabinet).

Electrical machines in HEP systems in accordance with examples of the present disclosure are designed to be resilient enough such that a short circuit across the terminals of the electrical machine can be withstood indefinitely. Specifically, the short-circuit current of the electrical machine may be very close or equal to the rated current of the electrical machine. Additionally, the AC-DC converter circuitry may be designed to be able to pass the full rated current of the electrical machine.

However, when a short circuit or other electrical fault occurs, unless appropriate mitigation action is taken (as disclosed herein), the energy associated with the fault may be dissipated at the location of the fault. High energy dissipation through a single fault point can cause high temperatures and/or sparks which, if left unchecked, could lead to a fire hazard. Even if the electrical machine is promptly disconnected from an engine spool that connects the electrical machine to a thermal engine, inertia in the electronical machine can continue to generate more power, feeding the short circuit.

This situation can be protected against, however, as will be explained in further detail with reference to FIG. 1.

Figure 1:
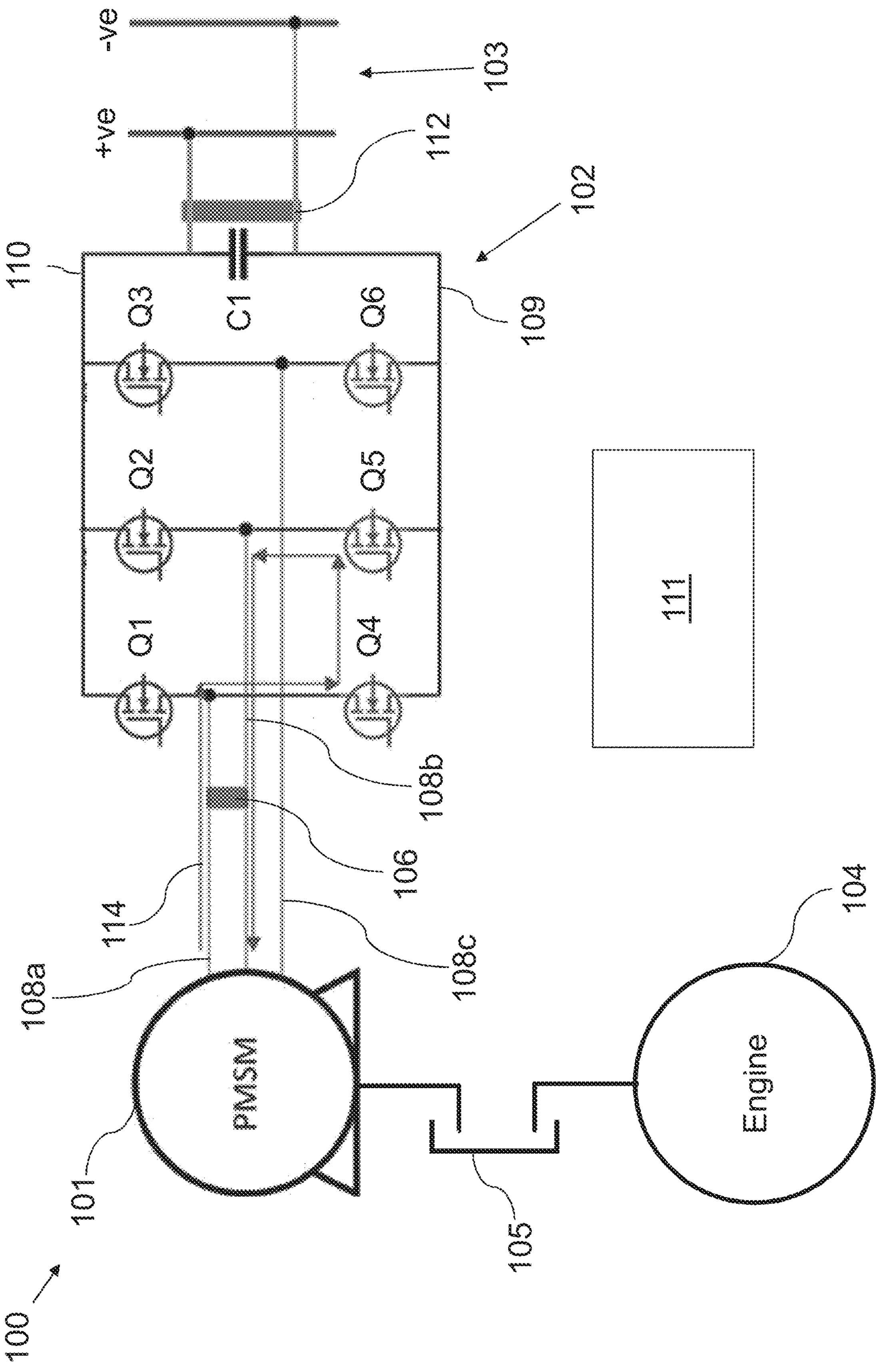
FIG. 1 is a schematic diagram of an electrical system, according to an example of the present disclosure, showing how it can protect against AC and DC faults.

FIG. 1 shows an electrical system 100 for an aircraft, in accordance with an example of the present disclosure, in addition to an aircraft engine 104. The electrical system 100 may be a portion of a larger electrical system. It is suitable for protecting the aircraft from electrical faults, as explained below. The system 100 comprises an electrical machine 101, which in this example is a permanent magnet synchronous motor (PMSM). The electrical machine 101 in this example is a three-phase electrical machine, though it could have a different number of phases.

The system 100 further comprises a HVDC bus 103 for supplying high voltage DC power (e.g. at 1,000V) to various components of the aircraft, including a battery system (not shown). The HVDC bus 103 is galvanically isolated, meaning that both positive and negative rails of the bus are electrically insulated from an electrical earth. In order to provide AC power to the electrical machine 101, when the electrical machine 101 is being operated in a motoring mode to provide thrust to the aircraft, the HVDC bus 103 is electrically coupled to an AC-DC switching converter 102. This is in turn electrically coupled to three AC phase lines 108*a*, 108*b*, 108*c*. The AC phase lines 108*a*-108*c* connect to the terminals of the electrical machine 101. The AC-DC switching converter 102 is configured to convert DC power received from the HVDC bus 103 (e.g. from the battery system) into AC power to be supplied to the electrical machine 101 when the electrical machine 101 is in a motoring mode. It is also able to convert AC power generated by the electrical machine 101 into DC power for the HVDC bus 103 when the electrical machine 101 is in a generating mode.

The electrical machine 101 is also selectively mechanically couplable to a spool of the thermal engine 104 (e.g. a jet engine) which can also be mechanically coupled to a propeller or fan of the aircraft. The selective mechanical coupling between the electrical machine 101 and the engine 104 is provided by a mechanical coupling 105, which can connect or disconnect the electrical machine 101 to or from the engine 104 in response to electrical signals. The signals may be indicative of different flight states of the aircraft, and also, in examples presented herein, indicative of an electrical fault in the aircraft.

The AC-DC switching converter 102 is, in this example, a two-level converter having a set of six switches Q1, Q2, Q3, Q4, Q5, Q6. The switches Q1-Q6 have anti-parallel diodes such that current can always flow in one direction whether they are open or closed. In this example, the switches Q1-Q6 are MOSFETs, and anti-parallel diodes are inherently provided by the body diodes of each MOSFET. In some examples, other types of switches may be used. The switches Q1-Q6 are rated to withstand a sustained short circuit at the rated phase current of the electrical machine 101.

The AC-DC switching converter 102 is connected to the HVDC bus 103 via a negative DC line 109 and a positive DC line 110.

The system 100 also has a controller 111, which in the example of FIG. 1, includes a microcontroller for executing software instructions, but which in other examples may comprise only hardware (e.g. discrete components or an ASIC or an FPGA).

The controller 111 is arranged to control operation of the electrical system 100, and can issue commands to the various components of the system 100. The controller 111 can control the AC-DC switching converter 102 by controlling operation of the switches Q1-Q6 (i.e. command a set of the switches Q1-Q6 to open and close). The controller can also direct the mechanical coupling 105 to disconnect the electrical machine 101 from the engine 104. The controller 111 may be a single central controller as shown in FIG. 1, or it may be a distributed controller.

When providing normal rectification or inversion (i.e. not during an electrical fault condition), the controller 111 opens and closes the switches Q1-Q6 with every rotation of the electrical machine 101 in accordance with conventional principles. However, the controller 111 is also configured to control the switches Q1-Q6 differently to mitigate an electrical fault (e.g. an AC or a DC short circuit) when it receives a signal indicative of an electrical fault in wiring or equipment which is electrically coupled to the AC-DC switching converter 102.

FIG. 1 shows the system 100 in a state where an AC line-to-line short circuit fault 106 is occurring, but is being mitigated as a result of the configuration of the AC-DC switching converter 102 as controlled by the controller 111. More detail will be provided on this below. In addition to AC line-to-line short circuit faults, the electrical system 100 may also experience DC short circuit faults. FIG. 1 also shows a DC fault 112 occurring in the wiring of the system 100. Specifically, the DC fault 112 is between the positive DC line 110 and the negative DC line 109. In practice, only one of these faults is likely to occur at a time, but both are shown in FIG. 1 for illustration purposes.

As mentioned above, it is important to mitigate the effect of these electrical faults. This is achieved by the controller 111, in response to receiving a signal indicating that an electrical fault has been detected, commanding the three switches Q4, Q5, Q6 that are connected to the negative DC line 109 to be in an on (closed) state, and the three switches Q1, Q2, Q3 that are connected to the positive DC line 110 to be in an off (open) state, and to maintain in this state over a period of time lasting many times longer than one rotation of the electrical machine 101. This provides a low impedance path for AC electrical current output from the electrical machine 101 (due to inertia and/or back-EMF) to flow along in parallel to the fault impedance due to the short circuit 106 or 112.

As a result, the fault current path 114 can principally be directed through the AC-DC switching converter 102. Regarding the specific fault path 114 shown in FIG. 1, which is active during a fraction of a rotation of the electrical machine 101, the current path flows from the first AC line 108*a*, through the fourth converter switch Q4, then up through the body diode of the fifth converter switch Q5, before being returned towards the electrical machine via the second AC line 108*b*. At other stages in each rotation, the current will flow through other pairs of the switches Q4, Q5, Q6, and in alternating directions.

As part of the fault mitigation method, the controller 111 (or another part of the aircraft systems) commands the mechanical coupling 105 to disconnect the electrical machine 101 from the engine 104, in response to a detection of the same electrical fault. Consequently, the electrical machine 101 enters a coast down mode after a fault (e.g. short circuit) is detected. Once the coast down has been completed, the electrical machine 101 will no longer produce power and will therefore cease to feed power to the fault 106, 112.

Thus, the AC-DC converter 102 is commanded to electrically couple (i.e. clamp) the AC phase lines 108*a*-108*c* to a common DC line (in this example, the negative DC line 109), while the electrical machine 101 coasts down to stationary. The short-circuit current is principally or entirely dissipated in the AC-DC converter 102 and the electrical machine 101, which are both rated to handle the current, rather than being dissipated at the fault 106, 112.

While in this example all three low side switches Q4, Q5, Q6 have been closed, if the controller 111 is aware that only a subset of the AC lines are affected (e.g. that the AC fault 106 is between first AC line 108*a* and the second AC line 108*b*), then the controller 111 may, in some examples, command only a specific pair of the low side switches to enter the ON state. In the example illustrated in FIG. 1, the controller 111 might only command fourth and fifth switches Q4, Q5 to be in the on state. However, in other examples, all the AC phase lines 108*a*-108*c* are always clamped to the common DC line when a fault is detected; this may be a simpler and therefore desirable approach; it may have additional safety benefits (e.g. in the event that the short circuit fault spreads to additional phase lines).

By closing the three switches Q4, Q5, Q6 (i.e. those switches directly connected to the negative DC line 109) in response to a short circuit fault being detected, the AC-DC switching converter 102 is effectively providing a 3-phase short circuit through the low side switches Q4, Q5, Q6. Since the AC-DC switching converter 102 is designed to carry the full rated current of the electrical machine 101, the AC-DC switching converter 102 remains unharmed for the duration of the fault mitigation process.

Therefore, it can be seen that an HEP electrical system 100 which implements this specific active clamping routine has the benefit of providing a bypass route for the fault current of a short circuit which flows through the fault tolerant converter 102. Thus, minimal energy is dissipated directly at the fault location, be it on the AC or DC side, and so there is a greatly reduced risk of fire hazards after a short circuit, or other electrical fault, in the wiring or equipment of the aircraft.

Figure 2:
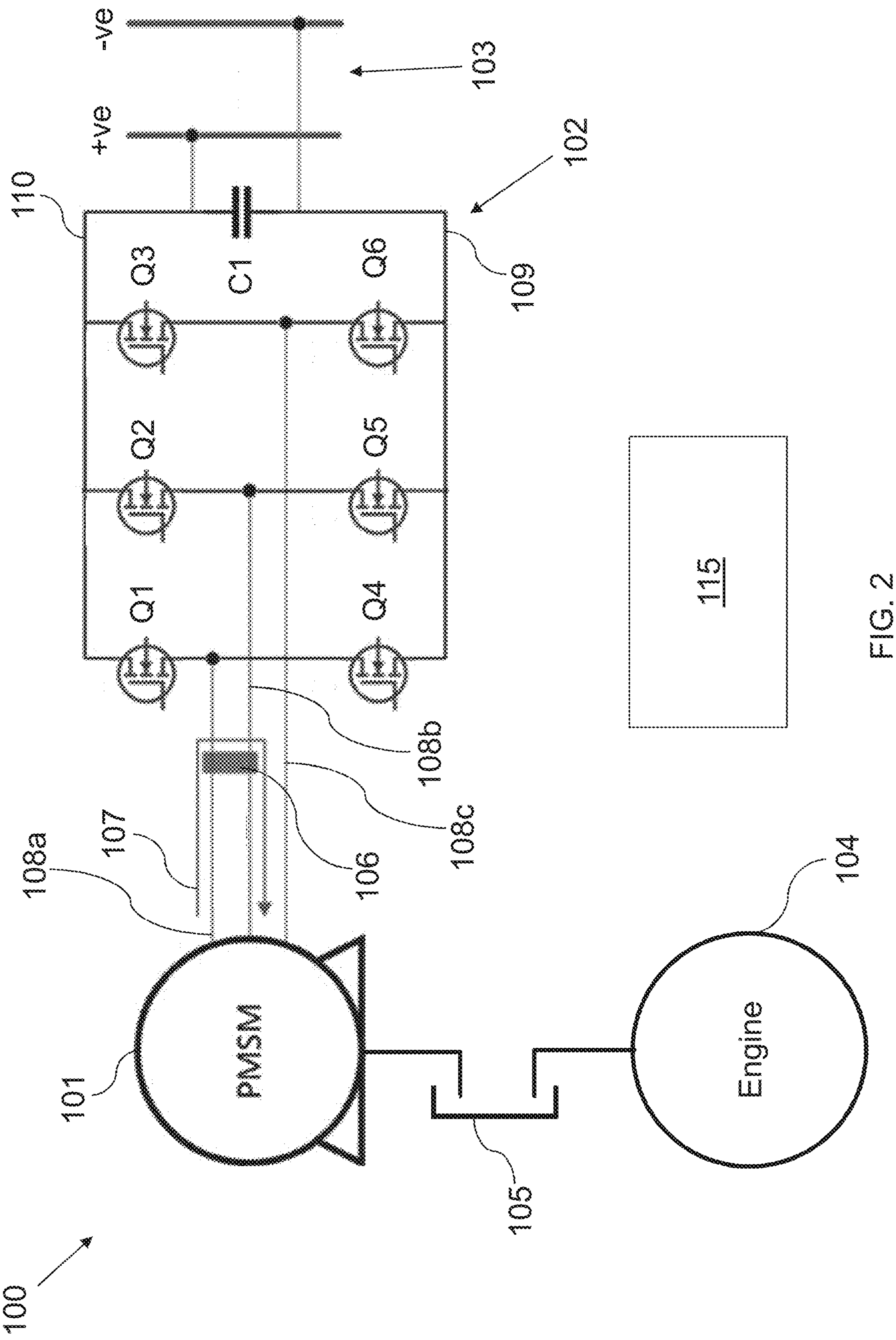
FIG. 2 is a schematic diagram of the electrical system when experiencing an AC line-to-line fault.
Figure 3:
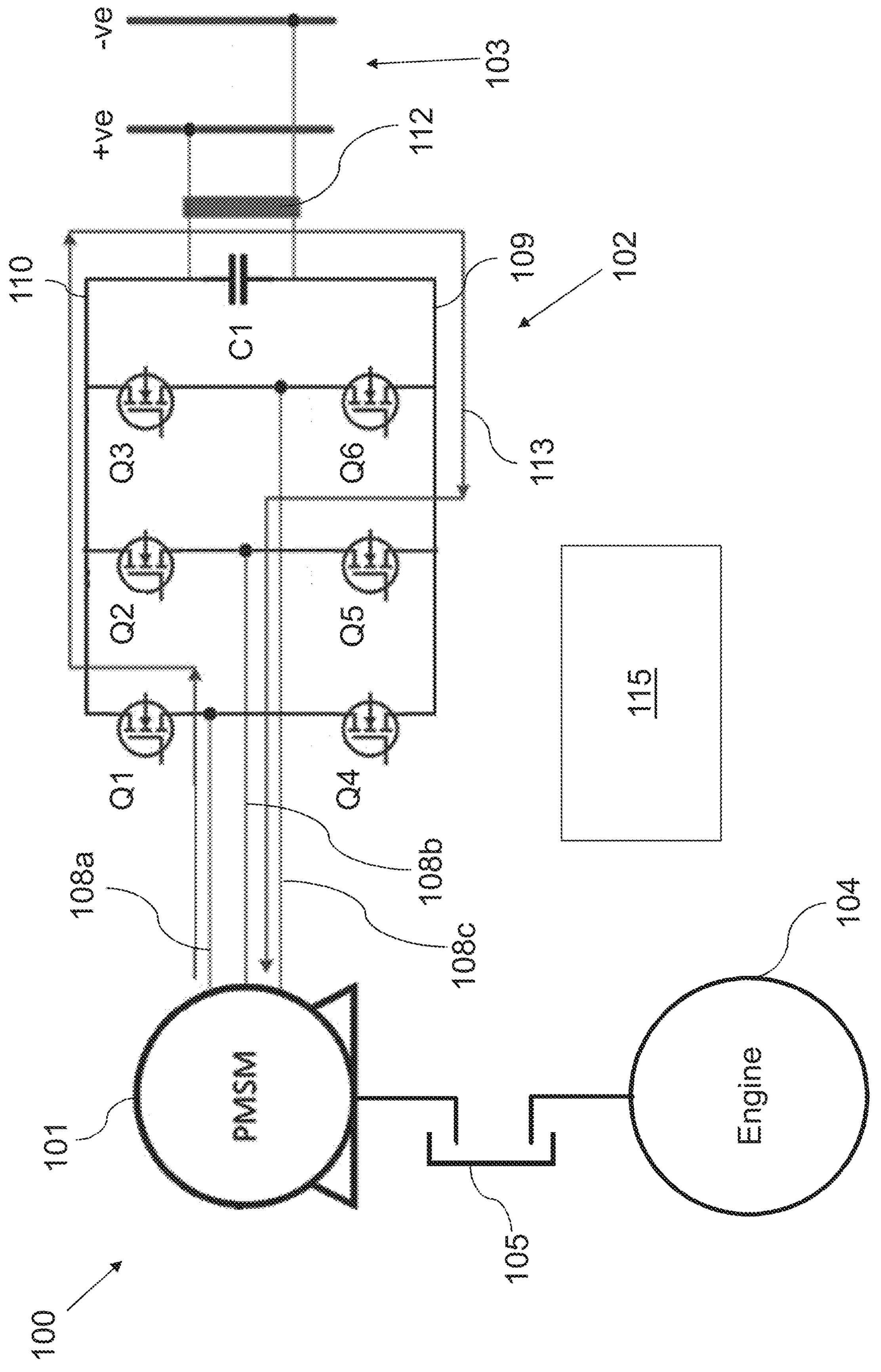
FIG. 3 is a schematic of the electrical system when experiencing a DC short circuit.

In contrast, FIGS. 2 and 3 show, for the sake of comparison, what would happen in the electrical system 100 if the mitigation method implemented by the controller 111 were not to be used. FIGS. 2 and 3 show the same system 100, but with a different controller 115 that does not implement the methods disclosed herein but which simply opens all switches Q1-Q6 of the converter 102 in response to an electrical fault.

FIG. 2 shows the system 100 in a state where an AC line-to-line (short circuit) fault 106 is occurring. The path 107 taken by the fault current is shown in FIG. 2. Only one fault current path for a specific polarity of the electrical machine 101 is shown for simplicity. In a straightforward approach after an AC short circuit 106 has been detected, the controller 115 controls the switches Q1-Q6 to all be in the off (open) state. This isolates the AC fault 106 from the HVDC bus 103. However, as can be seen in FIG. 2, the fault current path 107 is confined to the AC phase lines 108*a*, 108*b* which are the phase lines affected by the short circuit. It can therefore be seen that all of the energy associated with the short circuit is dissipated at the fault location 106. This presents many safety issues, as the AC phase lines 108*a*-108*c* may not be able to withstand the sustained energy load of the fault 106. This can lead to substantial energy being dissipated at the fault location, which could lead to a fire.

Similarly, FIG. 3 shows the system 100 in a state where a DC fault 112 is occurring. As in FIG. 1, the DC fault 112 is between the positive DC line 110 and the negative DC line 109. After a DC short circuit 112 has been detected in the electrical system 100, the controller 115 controls the switches Q1-Q6 to all be in the off (open) state. As with FIG. 2, only one fault current path 113 for the DC fault 112 for a specific polarity is shown for simplicity, though it is appreciated that the DC fault 112 affects all three phases of the electrical machine 101. Due to the location of the DC fault 112, the fault current path 113 is directed through the first AC line 108*a*, then the positive DC line 110, then the DC fault 112, and then returns through the negative DC line 109 and the third AC line 108*c*. This fault current takes this path based on the conducting state of the switches Q1-Q6 (all are OFF in FIG. 3 in response to the DC fault).

Even if the electrical machine 101 is coasting down after being disconnected from the engine 104 in response to the detected fault, the current will still be generated and still contribute to the DC short circuit 112, causing high energy to be accumulated at the fault location 112. As with the AC fault 106 in FIG. 2, a large amount of energy is dissipated at the DC fault location 112, which risks causing a fire within the aircraft.

Returning to the methods of the present disclosure, an exemplary method which may be implemented on the system 100 as illustrated in FIG. 1 will now be explained in more detail with reference to FIG. 4.

Figure 4:
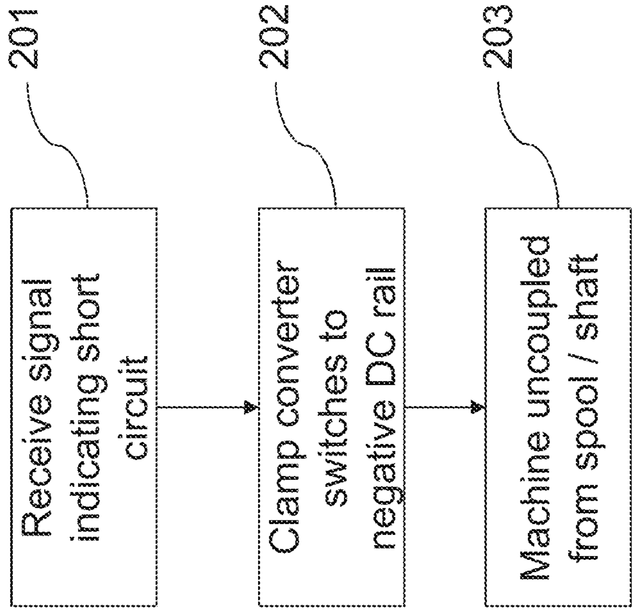
FIG. 4 is a flowchart depicting a method for protecting an aircraft from an electrical fault according to an example of the present disclosure.

FIG. 4 is a flowchart of the method for mitigating an electrical fault in the wiring or equipment of an electrical system 100 of an aircraft (i.e. one with the controller 115). At step 201, the controller 111 receives a signal indicative of a short circuit. This may be received from any of a number of sources, depending on the nature of the short circuit fault. It may be received from fault detection circuitry in the controller 111 or elsewhere on the aircraft. For example, the short circuit may be indicated from a signal sent by an overcurrent sensor arranged as part of the aircraft AC wiring between the converter 102 and the electrical machine 101. The signal received may indicate whether the fault is an AC or a DC short circuit, and optionally provide additional information about the fault, although this is not essential.

At step 202, the controller 111 commands the switches of the converter 102 to clamp the AC phase lines 108*a*-108*c* to a common DC line. In the example of FIG. 1, the common DC line is the negative DC line 109, though it will be understood that the AC phase lines 108*a*-108*c* could, in other examples, be clamped to the positive DC line. Clamping the AC phase lines 108*a*-108*c* to the negative DC line 109 is achieved by the controller 111 commanding the low side switches Q4, Q5, and Q6 to be ON (closed), while the switches Q1, Q2, and Q3 are commanded to be OFF (open). As described above, this provides a low impedance path for the fault current 114 to flow for the duration of the fault, mitigating the risk of arcing and fires, since the converter 102 can withstand the fault indefinitely. All six switches Q1-Q6 are not closed simultaneously, as this would short the HVDC bus 103 leading to failure of the converter 102.

At step 203, once the converter 102 switches Q1-Q6 have clamped the fault current path to the negative DC rail 109, the electrical machine 101 is decoupled from the engine spool, and consequently the engine 104. This is done by the controller 111, or another system on the aircraft, sending a signal to the mechanical coupling 105 which physically disconnects the electrical machine 101 from the engine spool. The disconnection may be initiated at the same time as the clamping of the switches; however, it might not be completed until later due to the time taken to actuate the coupling 105. Once disconnected, the electrical machine 101 can begin to coast down.

After these steps are implemented, the electrical machine 101 can coast down to stationary while the fault current is directed through the converter 102 via the negative DC line 109, thereby preventing damage (e.g. dangerous overheat) to the wiring or equipment of the aircraft at the location of the short circuit fault. This safely contains the short circuit, and allows the aircraft to continue operation until maintenance crews can attend to repairing the fault location.

It will be appreciated by those skilled in the art that the disclosure has been illustrated by describing one or more specific examples thereof, but is not limited to these examples; many variations and modifications are possible, within the scope of the accompanying claims.

What is claimed is:

1. An electrical system for protecting an aircraft from electrical faults, the electrical system comprising:

an AC-DC switching converter; and a controller configured to control the AC-DC switching converter;

wherein the AC-DC switching converter comprises:

a set of AC phase lines configured to be electrically coupled to an electrical machine of the aircraft;

a positive DC line and a negative DC line configured to be electrically coupled to a DC bus of the aircraft; and a plurality of sets of converter switches, each set of converter switches comprising a first converter switch coupled to the positive DC line and a second converter switch coupled to the negative DC line and coupled in series with the first converter switch, each AC phase line associated with a different set of converter switches;

wherein the controller is configured, in response to determining that an electrical fault affects a subset of the AC phase lines, to close the second converter switch or switches only in the set or sets of converter switches associated with the subset of the AC phase lines and to open all of the first converter switches and all other second converter switch or switches so as to electrically couple the subset of the AC phase lines to a common one of the DC lines for a period of time spanning a plurality of revolutions of the electrical machine.

2. The electrical system of claim 1, wherein the sets of converter switches comprise three sets of converter switches.

3. The electrical system of claim 1, wherein each AC phase line is electrically coupled to the AC-DC switching converter between the first and second converter switches in the associated set of converter switches.

4. The electrical system of claim 1, wherein:

the set of AC phase lines comprises a set of three AC phase lines configured to be coupled to a three-phase electrical machine; and the AC-DC switching converter comprises exactly six converter switches.

5. The electrical system of claim 1, wherein the controller is further configured to close all of the second converter switches in all of the sets of converter switches so as to electrically couple all of the AC phase lines to the common one of the DC lines.

6. The electrical system of claim 5, wherein the controller is further configured to open all of the first converter switches in all of the sets of converter switches so as to electrically decouple all of the AC phase lines from another one of the DC lines.

7. The electrical system of claim 1, further comprising detection circuitry configured to detect electrical faults in wiring or equipment electrically coupled to the AC-DC switching converter and to output signals indicative of the electrical faults to the controller.

8. The electrical system of claim 1, wherein each of the plurality of converter switches is rated to handle a current equal to or higher than a rated phase current of the electrical machine.

9. The electrical system of claim 1, wherein the controller is further configured to mechanically decouple the electrical machine from a thermal engine and/or from a propeller or fan of the aircraft in response to the electrical fault.

10. The electrical system of claim 1, wherein the electrical fault is a short circuit.

11. The electrical system of claim 1, wherein the AC-DC switching converter is a two-level converter.

12. The electrical system of claim 1, wherein the electrical machine forms part of the electrical system.

13. A hybrid-electric propulsion system for a hybrid-electric aircraft, comprising:

an electrical machine for propelling the aircraft; and the electrical system of claim 1, wherein the set of AC phase lines is electrically coupled to the electrical machine for propelling the aircraft.

14. A method for protecting an aircraft from an electrical fault by controlling an AC-DC switching converter of an electrical system of the aircraft, wherein the AC-DC switching converter comprises a set of AC phase lines electrically coupled to an electrical machine of the aircraft, a positive DC line and a negative DC line electrically coupled to a DC bus of the aircraft, and a plurality of sets of converter switches, each set of converter switches comprising a first converter switch coupled to the positive DC line and a second converter switch coupled to the negative DC line and coupled in series with the first converter switch, each AC phase line associated with a different set of converter switches, the method comprising:

in response to determining that an electrical fault affects a subset of the AC phase lines, closing the second converter switch or switches only in the set or sets of converter switches associated with the subset of the AC phase lines and opening all of the first converter switches and all other second converter switch or switches so as to electrically couple the subset of the AC phase lines to a common one of the DC lines for a period of time spanning a plurality of revolutions of the electrical machine.

15. The method of claim 14, wherein:

the sets of converter switches comprise three sets of converter switches; and each AC phase line is electrically coupled to the AC-DC switching converter between the first and second converter switches in the associated set of converter switches.

16. The method of claim 14, further comprising, in response to a different electrical fault:

closing all of the second converter switches in all of the sets of converter switches so as to electrically couple all of the AC phase lines to the common one of the DC lines; and opening all of the first converter switches in all of the sets of converter switches so as to electrically decouple all of the AC phase lines from another one of the DC lines.

17. The method of claim 14, further comprising:

mechanically decoupling the electrical machine from a thermal engine and/or from a propeller or fan of the aircraft in response to the electrical fault.

18. A non-transitory machine readable medium containing instructions for execution by at least one processor of a controller for controlling an AC-DC switching converter of an electrical system of an aircraft, the AC-DC switching converter comprising a set of AC phase lines for electrical coupling to an electrical machine of the aircraft, a positive DC line and a negative DC line for electrical coupling to a DC bus of the aircraft, and a plurality of sets of converter switches, each set of converter switches comprising a first converter switch coupled to the positive DC line and a second converter switch coupled to the negative DC line and coupled in series with the first converter switch, each AC phase line associated with a different set of converter switches, wherein the instructions comprise:

instructions that, when executed, cause the controller, in response to determining that an electrical fault affects a subset of the AC phase lines, to close the second converter switch or switches only in the set or sets of converter switches associated with the subset of the AC phase lines and to open all of the first converter switches and all other second converter switch or switches so as to electrically couple the subset of the AC phase lines to a common one of the DC lines for a period of time spanning a plurality of revolutions of the electrical machine.

19. The non-transitory machine readable medium of claim 18, further containing instructions that when executed cause the controller, in response to a different electrical fault, to:

close all of the second converter switches in all of the sets of converter switches so as to electrically couple all of the AC phase lines to the common one of the DC lines; and open all of the first converter switches in all of the sets of converter switches so as to electrically decouple all of the AC phase lines from another one of the DC lines.

20. The non-transitory machine readable medium of claim 18, further containing instructions that when executed cause the controller to mechanically decouple the electrical machine from a thermal engine and/or from a propeller or fan of the aircraft in response to the electrical fault.

* * * * *